(12) United States Patent
Yamane et al.

(10) Patent No.: US 9,725,191 B2
(45) Date of Patent: Aug. 8, 2017

(54) APPARATUS FOR MANUFACTURING A WING BODY

(71) Applicant: MITSUBISHI HEAVY INDUSTRIES, LTD., Tokyo (JP)

(72) Inventors: Shigemi Yamane, Tokyo (JP); Mikio Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/046,196

(22) Filed: Feb. 17, 2016

(65) Prior Publication Data
US 2016/0159499 A1     Jun. 9, 2016

Related U.S. Application Data

(62) Division of application No. 13/877,488, filed as application No. PCT/JP2011/079210 on Dec. 16, 2011, now Pat. No. 9,296,465.

(30) Foreign Application Priority Data

Dec. 17, 2010     (JP) .................................. 2010-282369

(51) Int. Cl.
*B64F 5/00*     (2017.01)
*B23P 19/10*     (2006.01)
(Continued)

(52) U.S. Cl.
CPC ............ *B64F 5/0009* (2013.01); *B23P 19/10* (2013.01); *B64C 3/18* (2013.01); *B64F 5/10* (2017.01);
(Continued)

(58) Field of Classification Search
CPC .... B64F 5/0009; H04N 5/265; H04N 5/2253; B23P 19/10; B23P 2700/01
See application file for complete search history.

(56) References Cited

U.S. PATENT DOCUMENTS 6,167,607 B1    1/2001   Pryor
2004/0194296 A1   10/2004   Kosuge et al.
(Continued)

FOREIGN PATENT DOCUMENTS

JP           63-39745       2/1988
JP           5-23600        3/1993
(Continued)

OTHER PUBLICATIONS

International Search Report issued Jan. 17, 2012 in corresponding Application No. PCT/JP2011/079210, with English translation.
(Continued)

*Primary Examiner* — Moshe Wilensky
(74) *Attorney, Agent, or Firm* — Wenderoth, Lind & Ponack, L.L.P.

(57) ABSTRACT

The method for manufacturing the structure includes an imaging device installation process in which a camera 41 that obtains an image of a target hole 33 formed in an upper panel 31 is installed on the rear spar 22, and a positioning process in which relative positions are positioned by relatively moving the upper panel 31 and the rear spar 22 while the image of the target hole 33 obtained by the camera 41 and displayed on a monitor screen is aligned with a target line preset on the monitor screen.

5 Claims, 8 Drawing Sheets

(51) Int. Cl.
    *B64C 3/18*     (2006.01)
    *H04N 5/225*     (2006.01)
    *H04N 5/265*     (2006.01)
    *B64F 5/10*     (2017.01)

(52) U.S. Cl.
    CPC ........... *H04N 5/2253* (2013.01); *H04N 5/265* (2013.01); *B23P 2700/01* (2013.01); *Y10T 29/49895* (2015.01); *Y10T 29/53978* (2015.01)

(56) References Cited

U.S. PATENT DOCUMENTS

| | | | |
|---|---|---|---|
| 2008/0155807 A1* | 7/2008 | Toh | B21J 15/14 29/525.01 |
| 2009/0139072 A1* | 6/2009 | Buckus | B64F 5/0009 29/281.4 |

FOREIGN PATENT DOCUMENTS

| | | |
|---|---|---|
| JP | 9-148791 | 6/1997 |
| JP | 3143700 | 3/2001 |
| JP | 2003-149299 | 5/2003 |
| JP | 2004-237535 | 8/2004 |
| JP | 2008-007114 | 1/2008 |
| JP | 2010-201986 | 9/2010 |

OTHER PUBLICATIONS

Written Opinion of the International Searching Authority issued Jan. 17, 2012 in corresponding Application No. PCT/JP2011/079210, with English translation.
Office Action issued Jul. 15, 2015 in U.S. Appl. No. 13/877,488.
Notice of Allowance issued Nov. 17, 2015 in U.S. Appl. No. 13/877,488.
Office Action issued Apr. 3, 2015 in U.S. Appl. No. 13/877,488.

* cited by examiner

US 9,725,191 B2

APPARATUS FOR MANUFACTURING A WING BODY

TECHNICAL FIELD

The present invention relates to a method for manufacturing a structure and an apparatus for manufacturing a structure whereby a structure is manufactured by assembling a pair of members.

Priority is claimed on Japanese Patent Application No. 2010-282369, filed on Dec. 17, 2010, the content of which is incorporated herein by reference.

BACKGROUND ART

When manufacturing a structure by assembling a pair of members, the task of accurately positioning one of the members and the other of the members becomes necessary. As a method of such positioning, a method using a so-called plumb which has a weight hung at one end of a thread has been used conventionally. To use such a plumb, first, positioning holes are formed respectively at the places at which the positions of both members are to be aligned. Next, each of the members is separately disposed upward and downward, and the thread of plumb is passed through a hole of the one of the members located above to hang the weight vertically downward. While maintaining the weight so as to match the position of the hole of the other of the members located downward, the one of the members is descended toward the other of the members, or the other of the members is ascended toward the one of the members. Then, by matching the hole of the one of the members with the hole of the other of the members, the pair of members can be accurately positioned.

The positioning using the plumb is used as an effective positioning device especially when the surface of each member is a curved surface. This is because when the positioning holes are formed in each of the members orthogonal to the curved surface, the directions of axes of the holes do not coincide with the one of the members and the other of the members located vertically below it, making it impossible to see the hole of the other of the members through the hole of the one of the members.

As an example of the structure, an aircraft structure such as a main wing of an aircraft can be taken.

The present applicant has conventionally propounded an aircraft apparatus for manufacturing a structure whereby it is possible to ascend or descend one of the members toward the other of the members with high accuracy (see Patent Document 1).

PRIOR ART DOCUMENT

Patent Document

[Patent Document 1] Japanese Patent Application, First Publication No. 2010-201986

SUMMARY OF THE INVENTION

Problems to be Solved by the Invention

However, the conventional method for manufacturing the structure has a problem that both members are not accurately positioned and repair of positioning task occurs. More specifically, when using the plumb, any one of the members is descended or ascended in a state in which the weight is positioned between the one of the members and the other of the members. Accordingly, it is necessary to remove the plumb from between both the members immediately before both the members contact in order to prevent the weight from interfering with each member. After that, the operator descends or ascends the members relying on his or her feel or visual judgment. Therefore, an error could occur in the positioning of both the members depending on, for example, the skill of the operator. In such a case, the positioning task entails repair.

In consideration of the above-mentioned circumstances, it is an object of the present invention to provide a method for manufacturing a structure whereby it is possible to position a pair of members with high accuracy by a simple operation when manufacturing a structure by assembling a pair of members.

Means for Solving the Problems

A method for manufacturing a structure according to a first aspect of the present invention, in which members with holes formed therein are moved so that the holes thereof line up and then the members are assembled, the method includes: an imaging device installation process for installing an imaging device adopted to obtain an image of a hole formed in one of the members on the other of the members, and a positioning process for relatively positioning the members by moving the members while the image of the holes obtained by the imaging device and displayed on a monitor screen is aligned with a marking preset on the monitor screen.

According to the method of the first aspect of the present invention, the members can be positioned with high accuracy by a simple operation in which the members are relatively moved while the image of the holes obtained by the imaging device and displayed on the monitor screen is aligned with the marking on the monitor screen. Further, because such a task can be carried out by one worker, it is possible to reduce total costs by reducing of labor costs.

In addition, even if an axis of the hole formed in each of the member is inclined with respect to the direction in which the members are moved, the image of the hole in the one of the members can be reliably obtained by the imaging device installed on the other of the members. Thus, accurate positioning of the members becomes possible.

In addition, in the method for manufacturing the structure according to a second aspect of the present invention, the imaging device obtains the image of the hole formed in the one of the member through a hole formed in the other of the member.

According to the method of the second aspect of the present invention, it is possible to reliably obtain the image of the hole formed in the one of the members.

In addition, in the method for manufacturing the structure according to a third aspect of the present invention, the structure is a wing body of an aircraft, the one of the members is a panel member that forms an outer surface of the wing body, and the other of the members is a spar disposed in a longitudinal direction of the wing body.

According to the method of the third aspect of the present invention, it is possible to position the panel member and the spar with high accuracy by a simple operation by one worker, even for a huge structure such as a wing body of an aircraft.

In addition, the method for manufacturing the structure according to a fourth aspect of the present invention includes another positioning process for positioning the relative positions of the sides of the members at the front end of the wing body after positioning a base end of the wing body in the positioning process.

According to the method of the fourth aspect of the present invention, it is possible to position the panel member and the spar with high accuracy throughout the whole structure by aligning the front end portion with a lateral reference after aligning the base end portion with a hole reference, even for a huge structure such as a wing body of the aircraft.

In addition, an apparatus for manufacturing a structure according to a fifth aspect of the present invention, in which members with holes formed therein are moved so that the holes thereof line up and then the members are assembled, the apparatus includes: an imaging device which is mounted on one of the members to obtain an image of a hole formed in the other of the members, a synthetic image generation device which generates a synthetic image by synthesizing preset marking information for aligning the other of the members with respect to the image of the hole, and a display device which displays the synthetic image thereon.

According to the configuration of the apparatus according to the fifth aspect of the present invention, the synthetic image generation device generates the synthetic image by synthesizing the preset marking information to the image of the hole obtained by the imaging device. In addition, this synthesized image is displayed on the display device. Thus, it is possible to position the members with high accuracy by a simple operation of relatively moving the members while aligning the image of the hole with the marking. Further, because such a task can be done by one worker, it is possible to reduce costs by the reduction of labor costs.

In addition, even if the axis of the hole formed in each of the member is inclined with respect to the direction in which the members are moved, it is possible to reliably obtain the image of the hole of one of the members by the imaging device installed on the other of the members. Thus, accurate positioning of the members becomes possible.

Advantageous Effect of the Invention

According to the method for manufacturing a structure of the present invention, it is possible to position a pair of members with high accuracy by a simple operation when manufacturing a structure by assembling a pair of members.

DESCRIPTION OF EMBODIMENTS

Hereinafter, an embodiment of the present invention will be described with reference to the drawings. First, a structure manufactured by an apparatus for manufacturing a structure according to the embodiment of the present invention will be described. In the present embodiment, the case of manufacturing a main wing of an aircraft as the structure will be described as an example.

Figure 1:
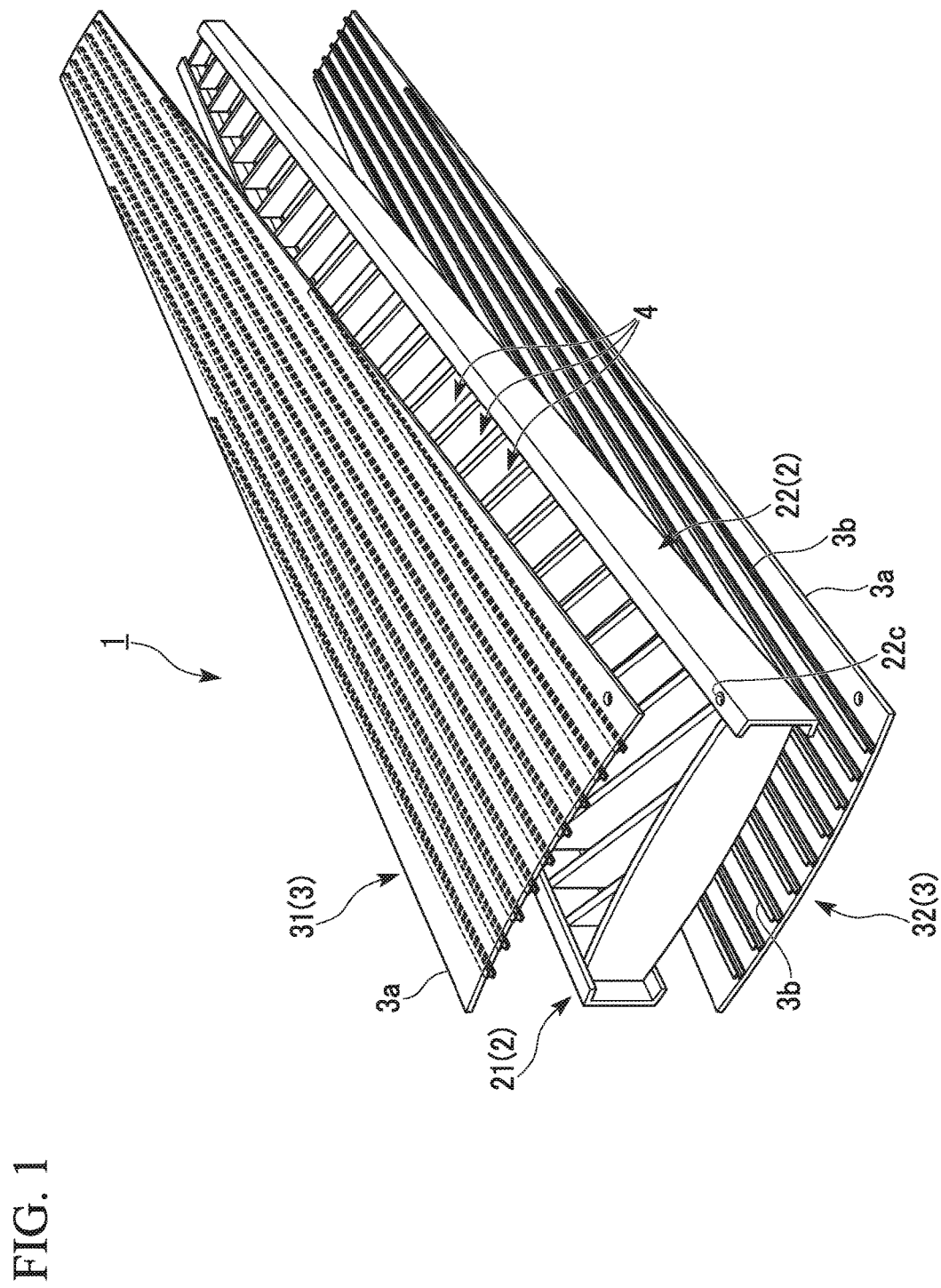
FIG. 1 is an exploded perspective view showing a schematic configuration of a main wing according to an embodiment of the present invention.

FIG. 1 is an exploded perspective view showing a schematic configuration of a main wing 1. The main wing 1 includes a pair of spars 2 forming opposite side portions thereof in the longitudinal direction, a pair of panels 3 forming an upper surface and a lower surface thereof, and a plurality of ribs 4 installed therein.

Figure 2:
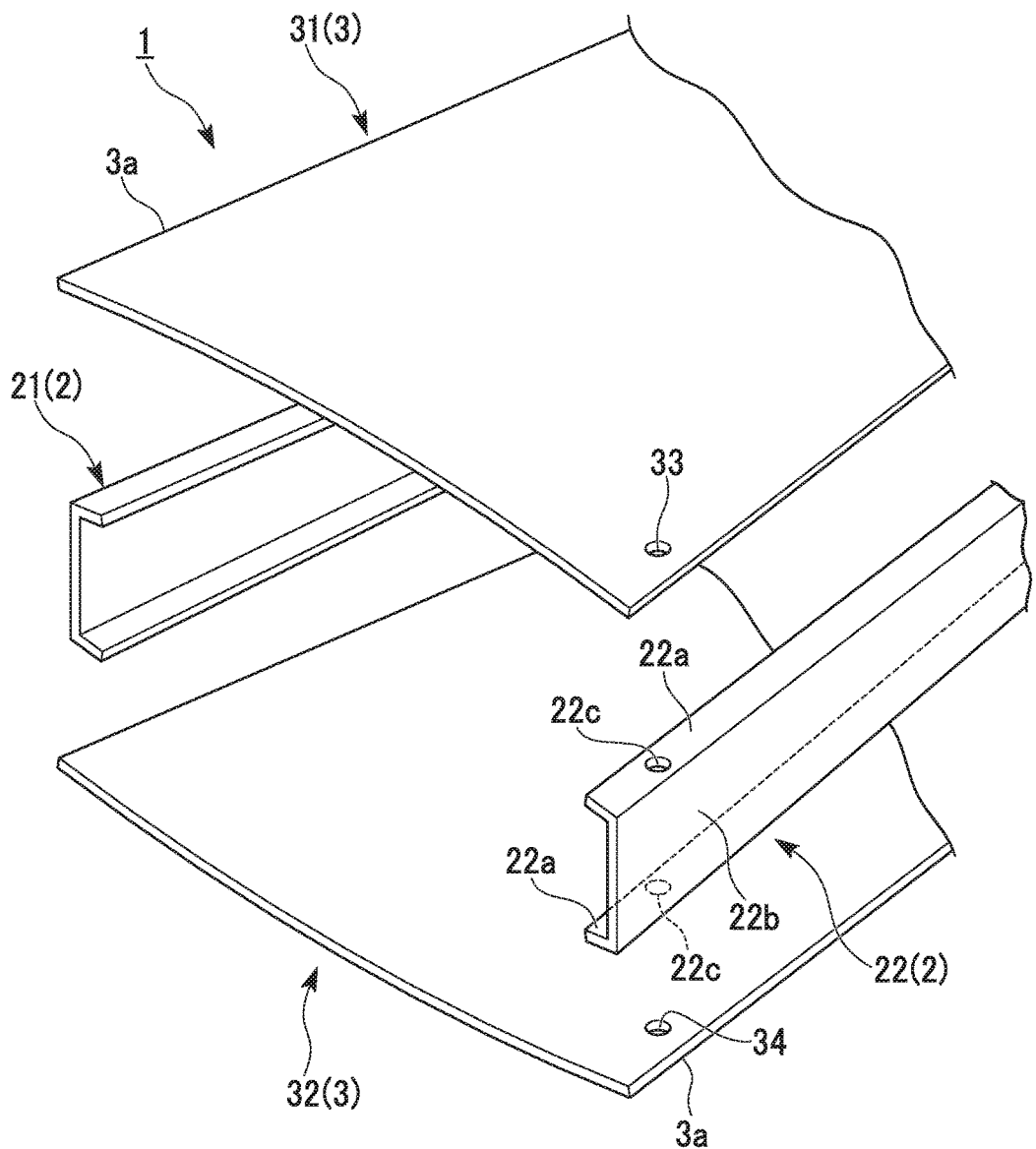
FIG. 2 is a perspective view schematically showing a base end portion of the main wing.

The pair of spars 2 includes a front spar 21 forming a side portion of the front of the aircraft and a rear spar 22 forming a side portion of the rear of the aircraft of opposite side portions of the main wing 1, as shown in FIG. 1. Here, FIG. 2 is a perspective view schematically showing a base end portion of the main wing 1 that is an end portion of the fuselage of the aircraft. In addition, the ribs 4 are not shown in FIG. 2. Both of the front spar 21 and the rear spar 22 are longitudinal members having a cross section of substantially a U shape, and have a pair of parallel pieces 22a that are substantially parallel to each other at a predetermined interval, and a connecting piece 22b for connecting one end portions of the parallel pieces 22a. Further, photographing holes 22c that vertically penetrate the pair of parallel pieces 22a are formed in the base end portions of the rear spars 22 respectively.

A pair of spars 2 configured like this are disposed at a predetermined interval such that respective open portions face each other.

A pair of panels 3 includes an upper panel 31 forming the upper surface of the main wing 1 and a lower panel 32 constituting the lower surface, as shown in FIG. 1. The upper panel 31 and the lower panel 32 have panel bodies 3a having curved cross-sectional shapes and a plurality of stringers 3b that are installed so as to extend in the longitudinal direction on one of the surfaces of the panel body 3a.

Here, as shown in FIG. 2, the panel body 3a of the upper panel 31 has a substantially trapezoidal shape so as to have the width gradually narrowed toward the front end from the base end as seen from a plane, and its base end portion has a target hole 33 that is formed by vertically penetrating the panel body 3a at a position corresponding to the photographing hole 22c of the rear spar 22. Further, the panel body 3a of the lower panel 32 also has almost the same shape as the panel body 3a of the upper panel 31 as seen from the plane, and its base end portion has a target hole 34 that is formed by vertically penetrating the panel body 3a at a position corresponding to the photographing hole 22c of the rear spar 22.

Meanwhile, the stringers 3b are members for increasing the bending stiffness of the upper panel 31 and the lower panel 32, and have substantially an H cross-sectional shape, as shown in FIG. 1.

The upper panel 31 and the lower panel 32 configured like this are disposed so as to cover the upper part and lower part of the pair of spars 2 with the stringers 3b facing inward, respectively.

Figure 3:
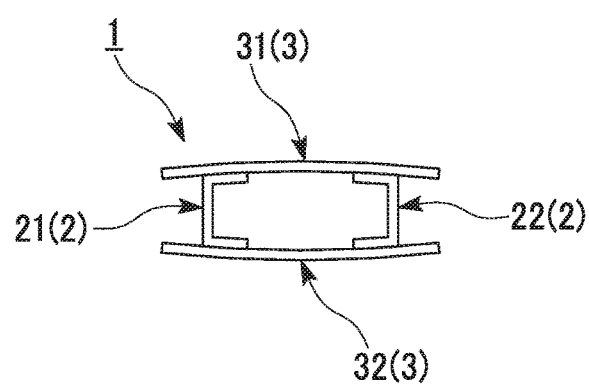
FIG. 3 is a sectional view schematically showing a front end portion of the main wing.

Here, FIG. 3 is a sectional view schematically showing the front end portion of the main wing 1, that is, the end portion opposite to the fuselage of the aircraft. Opposite ends in the width direction of the upper panel 31 and the lower panel 32 protrude from the pair of spars 2 by a predetermined distance at the front end portion of the main wing 1.

The plurality of ribs 4 are members for structurally reinforcing the main wing 1. These ribs 4 are installed at predetermined intervals in the longitudinal direction of the main wing 1 as shown in FIG. 1, and one of the ends of each rib 4 is connected to the front spar 21 and the other of the ends of each rib 4 is connected to the rear spar 22. Thus, the front spar 21 and the rear spar 22 are held at a predetermined interval.

Figure 4:
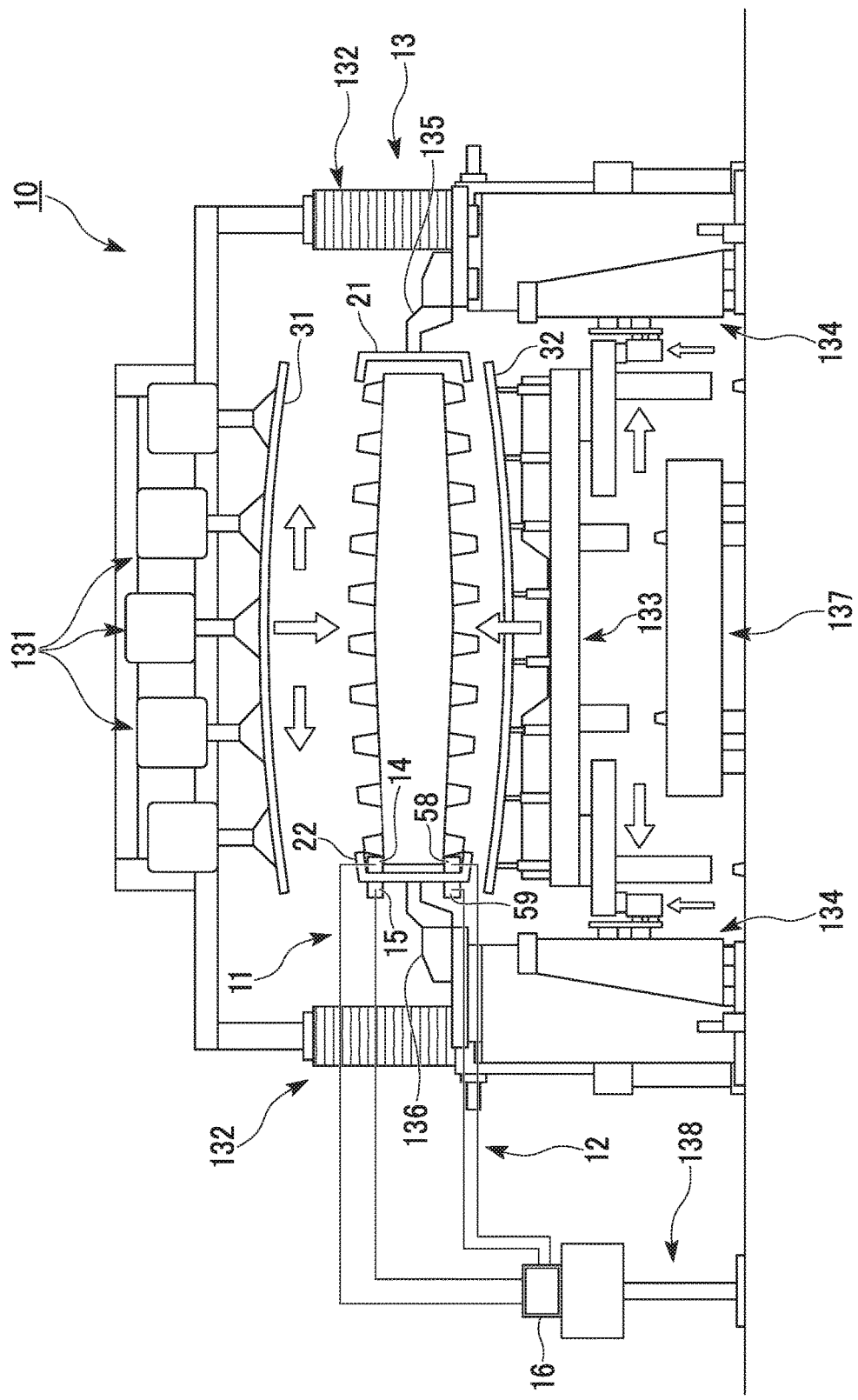
FIG. 4 is a schematic front view showing the configuration of a main wing manufacturing apparatus according to an embodiment of the present invention.

Next, an apparatus for manufacturing a structure used in a method for manufacturing the structure according to an embodiment of the present invention will be described. In the present embodiment, an example of a main wing manufacturing apparatus for manufacturing the main wing 1 of the aircraft will be described as the apparatus for manufacturing a structure. FIG. 4 is a schematic front view showing the configuration of a main wing manufacturing apparatus 10. The main wing manufacturing apparatus 10 includes a first positioning device 11 for mutually positioning the rear spar 22 and the upper panel 31 constituting the main wing 1, a second positioning device 12 for mutually positioning the rear spar 22 and the lower panel 32, and an assembling device 13 for assembling various members constituting the main wing 1.

Figure 5:
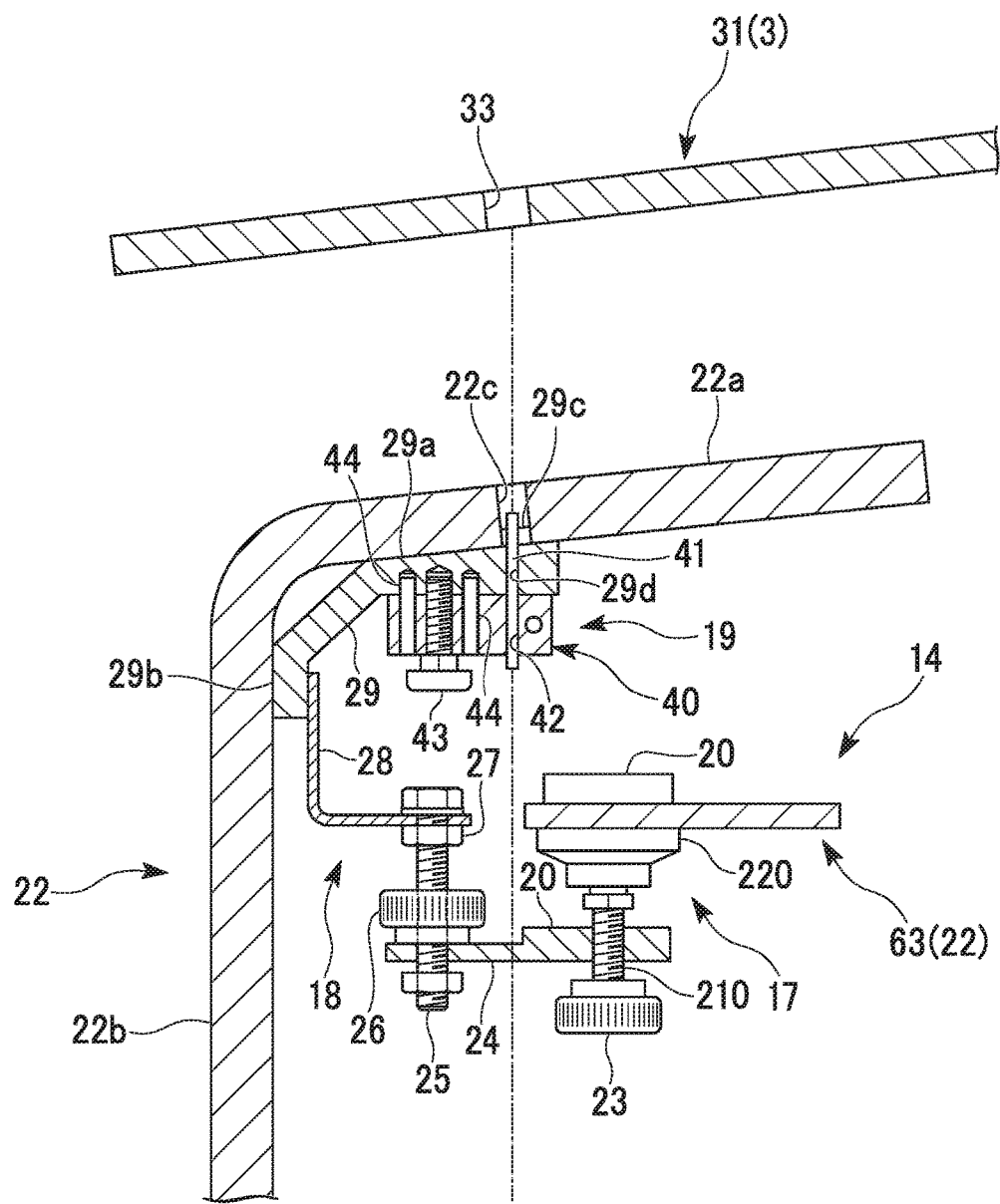
FIG. 5 is a schematic sectional view showing the state in which a base end portion camera unit is mounted on a rear spar.

The first positioning device 11 includes a base end portion camera unit 14 installed at the base end portion of the rear spar 22 constituting the main wing 1, a front end portion camera unit 15 installed at the front end portion of the rear spar 22, and a monitor screen 16 (a display device) electrically connected to the base end portion camera unit 14 and the front end portion camera unit 15 through wirings, respectively. Here, FIG. 5 is a schematic sectional view showing the state in which the base end portion camera unit 14 is mounted on the rear spar 22. Meanwhile, in the present embodiment, the base end portion camera unit 14 and the front end portion camera unit 15 are installed respectively at the base end portion and the front end portion of the rear spar 22, but instead of this, they may be installed respectively at the base end portion and the front end portion of the front spar 21.

The base end portion camera unit 14 includes a clamp unit 17 fixed to the rear spar 22, a positioning unit 18 for positioning with respect to the inner side of the rear spar 22, and a camera holding unit 19 for holding the camera, as shown in FIG. 5.

The clamp unit 17 has a contacting piece 20 contacting the rear spar 22, a shaft 210 screwed to the contacting piece 20, a pressing member 220 installed at one of the ends of the shaft 210, a first operation knob 23 installed at the other of the ends of the shaft 210, and a protruding piece 24 protruded from the contacting piece 20 and extending laterally, as shown in FIG. 5.

According to the clamp unit 17 configured like this, when the first operation knob 23 is pinched and rotated, according to the pinching and rotating, the shaft 210 is advanced and retreated with respect to the contacting piece 20, and the interval between the pressing member 220 and the contacting piece 20 is changed. Thus, by clamping predetermined places of the rear spar 22 between the pressing member 220 and the contacting piece 20, it becomes possible to mount the camera unit on the rear spar 22.

The positioning unit 18 has a bolt 25 screwed to the protruding piece 24, a second operation knob 26 installed immovably on the shank portion of the bolt 25, a nut 27 screwed to the shank portion of the bolt 25, and a reference block 29 fixed to the nut 27 through a support bracket 28, as shown in FIG. 5.

According to the positioning unit 18 configured like this, when the bolt 25 is rotated by turning the second operation knob 26, the nut 27 screwed thereinto is moved along the shank portion of the bolt 25. Accordingly, it is possible to move a reference block 29 fixed to the nut 27 upward and downward.

The reference block 29 has a first reference face 29a contacting the parallel piece 22a of the rear spar 22, a second reference face 29b contacting the connecting piece 22b of the rear spar 22, a protruding portion 29c protruding from the first reference face 29a, and a camera inserting hole 29d for inserting a camera therein, as shown in FIG. 5. Here, the angle made between the first reference face 29a and the second reference face 29b is formed substantially equal to the angle made between the parallel piece 22a and the connecting piece 22b of the rear spar 22. Further, the cross-sectional shape of the protruding portion 29c is formed so as to almost coincide with the cross-sectional shape of the photographing hole 22c formed in the parallel piece 22a.

The camera holding unit 19 has a camera holder 40 mounted on the reference block 29 of the positioning unit 18 and a camera 41 (an imaging device) held by the camera holder 40.

The camera holder 40 includes a camera fixing hole 42 in which the camera 41 is fixed, a fixing screw 43 for fixing the camera holder 40 to the reference block 29, and a pair of positioning pins 44 installed in protrusions on both sides of the fixing screw 43, as shown in FIG. 5. The camera holder 40 configured like this is positioned as the pair of the positioning pins 44 are inserted into the reference block 29, and then the fixing screw 43 is screwed to the reference block 29 so as to be fixed on the inner side of the reference block 29.

The camera 41 has an elongated shape with a substantially circular cross section as shown in FIG. 5. The camera 41 is inserted and fixed into the camera fixing hole 42 of the camera holder 40. Further, the camera 41 protrudes backward from the camera holder 40 and is inserted into the camera inserting hole 29d and the protruding portion 29c of the reference block 29. Since the camera 41 protrudes inward from the photographing hole 22c formed in the parallel piece 22a of the rear spar 22, the camera 41 faces vertically upward.

Figure 6:
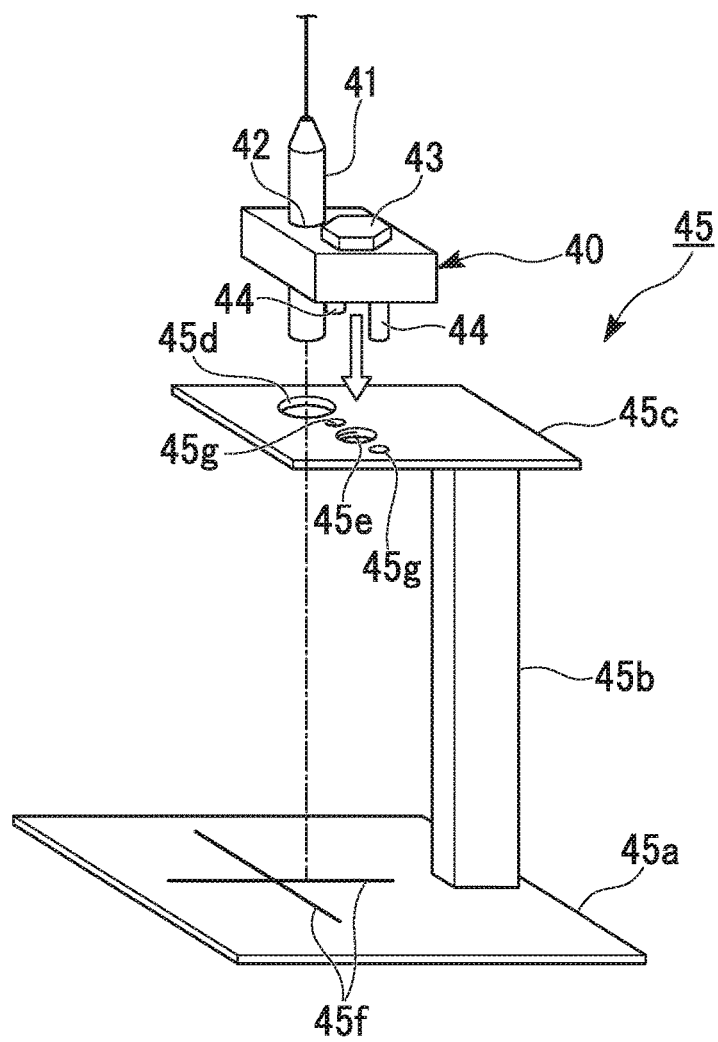
FIG. 6 is a schematic perspective view for describing the installation of a camera on a camera holder.

Here, FIG. 6 is a schematic perspective view for describing the mounting of the camera 41 on the camera holder 40. To mount the camera 41 on the camera holder 40, it is necessary to fix the camera 41 after positioning of the camera 41 in a circumferential direction of the camera fixing hole 42. Therefore, a camera reference position confirming device 45 shown in FIG. 6 is used in the present embodiment. This camera reference position confirming device 45 has a lower deck 45a, a leg portion 45b extending upward from the lower deck 45a, and an upper deck 45c installed at the top end of the leg portion 45b almost in parallel with the lower deck 45a. Here, the upper deck 45c includes a camera inserting hole 45d penetrating therein to insert the camera 41 and a fixing screw hole 45e formed therein to fix the fixing screw 43. In addition, a pair of pin holes 45g for inserting the pair of positioning pins 44 are formed on both sides of the fixing screw hole 45e. Further, cruciform reference lines 45f are marked on the lower deck 45a, and the intersection points of these reference lines 45f are separated by a predetermined distance horizontally from the center line of the camera inserting hole 45d. According to such a configuration, by screwing the fixing screw 43 into the fixing screw hole 45e while inserting the camera 41 in the camera inserting hole 45d, the camera holder 40, on which the camera 41 is not fixed but rotatably mounted, is fixed on the upper deck 45c. Then, the camera 41 obtains an image of the reference line 45f, and this image is displayed on a monitor screen, which is not shown. Here, a target line showing the position at which the reference line 45f is to be displayed is marked on the monitor screen in advance. Thus, if the position of the camera 41 is fixed after matching the image on the reference line 45f to the target line by properly rotating the camera 41 in the camera fixing hole 42 and the camera inserting hole 45d, it is possible to mount the camera 41 on the camera holder 40 in a proper state.

Figure 7:
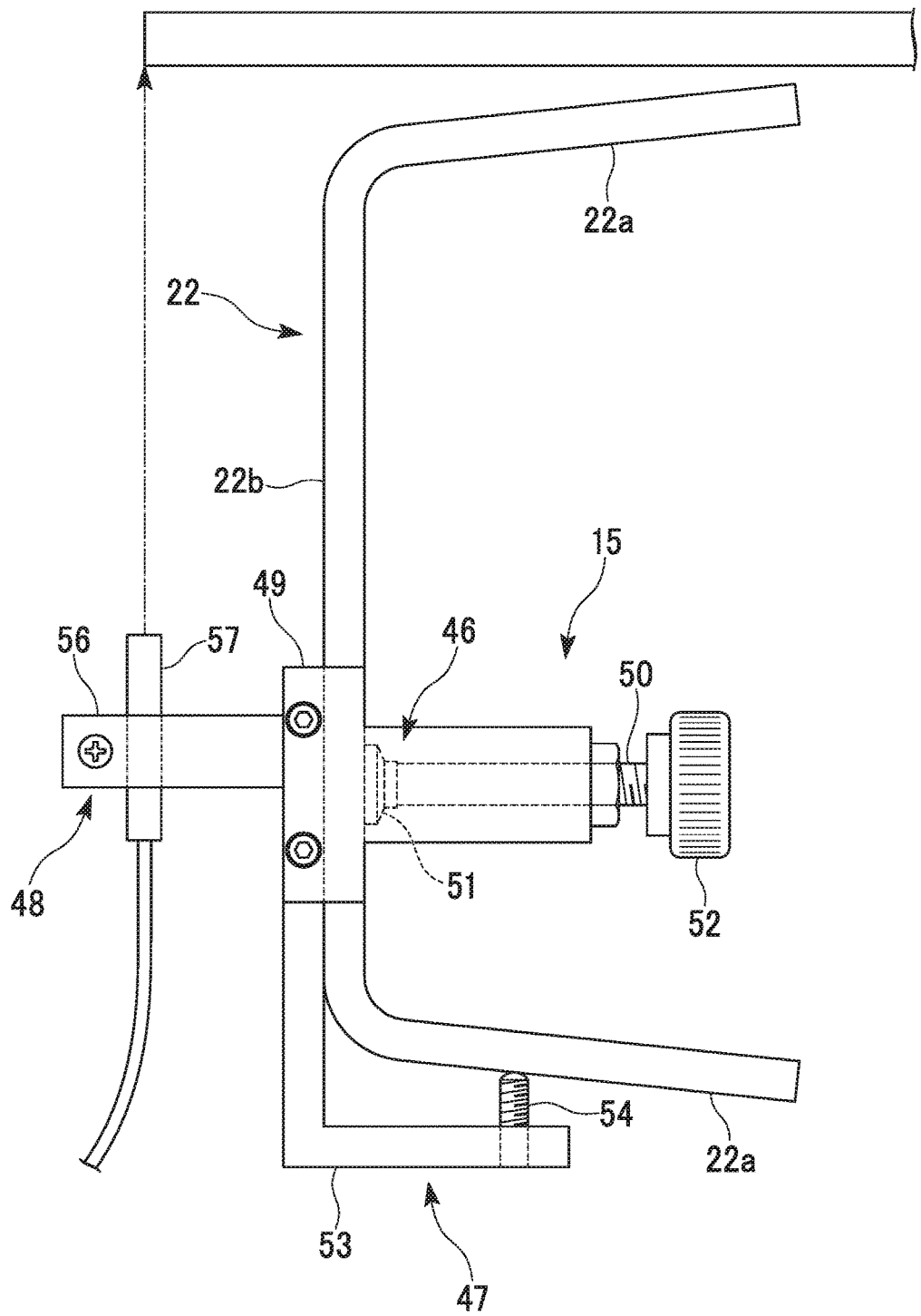
FIG. 7 is a schematic sectional view showing the state in which the front end portion camera unit is mounted on the rear spar.

Meanwhile, FIG. 7 is a schematic sectional view showing the state in which the front end portion camera unit 15 is mounted on the rear spar 22. The front end portion camera unit 15 includes a clamp unit 46 fixed on the rear spar 22, a positioning unit 47 positioned with respect to the outer surface of the rear spar 22 and a camera holding unit 48 for holding a camera 57.

The clamp unit 46 has a contacting piece 49 contacting the outer surface of the connecting piece 22b constituting the rear spar 22, a shaft 50 screwed to the contacting piece 49, a pressing member 51 installed at one of the ends of the shaft 50, and a first operation knob 52 installed on the other of the ends of the shaft 50, as shown in FIG. 7. According to the clamp unit 46 configured like this, when the first operation knob 52 is pinched and rotated, according to the pinching and rotating, the shaft 50 is advanced and retreated with respect to the contacting piece 49, and the interval between the pressing member 51 and the contacting piece 49 is changed. Thus, by clamping predetermined places of the rear spar 22 between the pressing member 51 and the contacting piece 49, it becomes possible to mount the camera unit 15 on the rear spar 22.

The positioning unit 47 has an L-shaped reference block 53 installed so as to be able to advance and retreat along the connecting piece 22b of the rear spar 22 and a positioning protrusion 54 protruding inwardly from the reference block 53, as shown in FIG. 7.

The camera holding unit 48 has a camera holder 56 mounted on the reference block 53 of the positioning unit 47 and the camera 57 (the imaging device) which is inserted and fixed in the camera holder 56 to face vertically upward. Meanwhile, when mounting the camera 57 on the camera holder 56, the aforementioned camera reference position confirming device 45 is used.

The second positioning device 12 shown in FIG. 4 includes a base end portion camera unit 58 installed at the base end portion of the rear spar 22, a front end portion camera unit 59 installed at the front end portion of the rear spar 22, and the monitor screen 16 (the display device) electrically connected to the base end portion camera unit 58 and the front end portion camera unit 59 through wirings. Meanwhile, because the configuration of each of these units is the same as in the first positioning device 11, a description thereof is omitted here.

The assembling device 13 shown in FIG. 4 includes upper panel suction units 131, upper elevating stands 132, a lower panel support unit 133, lower elevating stands 134, a front spar holding unit 135, a rear spar holding unit 136, a conveying unit 137 and a control panel 138.

The upper panel suction units 131 are members that hold the main wing 1 by sucking the upper panel 31 constituting the main wing 1. Further, the upper elevating stands 132 controls the motion of the upper panel 31 held in the upper panel suction units 131, and in more detail, can move the upper panel 31 in any direction such as two axial directions orthogonal to each other within the horizontal plane, a vertical direction, and a rotational direction around the vertical axis.

The lower panel support unit 133 is a member that supports the lower panel 32 constituting the main wing 1 from below. Further, the lower elevating stands 134 controls the motion of the lower panel 32 supported on the lower panel support unit 133, and can move the upper panel 31 in the four axial directions like the upper elevating stands 132.

The front spar holding unit 135 and the rear spar holding unit 136 are members that hold the front spar 21 and the rear spar 22 constituting the main wing 1 from the lateral direction so that the open portions are mutually opposed to each other. The front spar holding unit 135 and the rear spar holding unit 136 are installed so as to be able to advance and retreat in the horizontal direction.

As shown in FIG. 4, the conveying unit 137 is installed so as to be able to run in the direction substantially orthogonal to a longitudinal direction of the upper panel 31 and the lower panel 32 and is a member that brings in or takes out the lower panel support unit 133 with the lower panel 32 supported.

The control panel 138 is a member for controlling the motion of each unit of the assembling device 13. The monitor screen 16 constituting the first positioning device 11 and the second positioning device 12 is installed on the control panel 138. Accordingly, the worker can properly operate each unit of the assembling device 13 by operating the control panel 138 while looking at the monitor screen 16.

Figure 8:
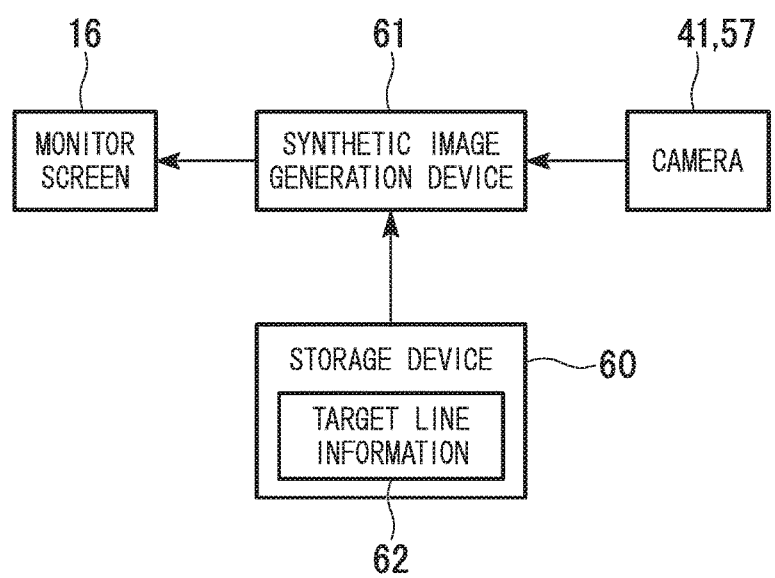
FIG. 8 is a block diagram showing the functional configuration of the main wing manufacturing apparatus.

Next, the functional configuration of the main wing manufacturing apparatus 10 will be described. FIG. 8 is a block diagram showing the functional configuration of the main wing manufacturing apparatus 10. The main wing manufacturing apparatus 10 includes cameras 41 and 57 (imaging device), a storage device 60, a synthetic image generation device 61, and the monitor screen 16 (the display device).

The camera 41 is a member which obtains the images of the target holes 33 and 34 formed respectively on the upper panel 31 and the lower panel 32. Further, the storage device 60 is a member which stores in advance the target line information 62 (the marking information) for aligning the upper panel 31 and the lower panel 32. The synthetic image generation device 61 is a member which generates synthetic images by synthesizing the image input from the camera 41 and the target line information 62 input from the storage device 60. Further, the monitor screen 16 is a member which displays the synthetic image generated by the synthetic image generation device 61. Meanwhile, while the present embodiment uses the information that displays lines as the marking information according to the present invention, the present invention is not limited thereto, and information that displays points or other information that displays figures may be used.

Next, the processes of the method for manufacturing the structure according to the embodiment of the present invention and the action effects thereof will be described.

First, the worker performs an imaging device installation process for installing the camera 41 on the rear spar 22. That is, the worker installs the base end portion camera unit 14 constituting the first positioning device 11 on the base end portion of the rear spar 22 and the front end portion camera unit 15 on the front end portion of the rear spar 22. In more detail, as shown in FIG. 5, the base end portion camera unit 14 is temporarily fixed on the rear spar 22 by clamping the protruding piece 63 protruding from the inner surface of the rear spar 22 with the clamp unit 17 of the base end portion camera unit 14. By operating the second operation knob 26 of the positioning unit 18 to move the reference block 29 upward, the first reference face 29a contacts the parallel piece 22a and the second reference face 29b is contacted on the connecting piece 22b. At this time, the protruding portion 29c protruding from the first reference face 29a is fitted into the photographing hole 22c formed in the parallel piece 22a. Thus, when the base end portion camera unit 14 is accurately positioned with respect to the rear spar 22, the camera 41 held in the camera holding unit 19 comes to face vertically upward. Meanwhile, although not shown in the drawing in detail, the second reference face 29b is adjusted in advance so as to contact the connecting piece 22b by mounting a predetermined number of overlapping plate-shaped shims having a predetermined thickness.

Further, as shown in FIG. 7, the connecting piece 22b of the rear spar 22 is clamped with the clamp unit 46 of the front end portion camera unit 15 and the front end portion camera unit 15 is accurately positioned with respect to the rear spar 22 by the worker, so that the camera 57 held in the camera holding unit 48 comes to face vertically upward.

Further, the base end portion camera unit 58 and the front end portion camera unit 59 constituting the second positioning device 12 are also installed respectively in the base end portion and the front end portion of the rear spar 22, likewise with the first positioning device 11.

Next, the worker performs a spar installation process for installing the rear spar 22 and the front spar 21. That is, as shown in FIG. 4, the worker holds the front spar 21 by the front spar holding unit 135, and holds the rear spar 22 by the rear spar holding unit 136. In addition, with the front spar holding unit 135 slightly retreats in the direction away from the rear spar holding unit 136, one of the ends of the rib 4 is fixed to the rear spar 22 and the front spar holding unit 135 is advanced to fix the other end of the rib 4 on the front spar 21. Accordingly, the front spar 21 and the rear spar 22 are unitized through the ribs 4. Meanwhile, with the rear spar 22 held with the rear spar holding unit 136, the axis of the photographing hole 22c shown in FIG. 5 that is formed in the rear spar 22 is inclined with respect to the vertical direction.

Next, the worker performs a positioning process for positioning the upper panel 31 and the lower panel 32 with respect to the rear spar 22 and the front spar 21, respectively. That is, the worker, as shown in FIG. 4, operates the control panel 138 to drive the upper elevating stand 132, with the upper panel 31 held with the upper panel suction unit 131, so as to descend the upper panel 31 substantially vertically downward. Meanwhile, with the upper panel 31 sucked by the upper panel suction unit 131, the axis of the target hole 34 shown in FIG. 5 that is formed in the upper panel 31 is inclined with respect to the vertical direction.

Figure 9A:
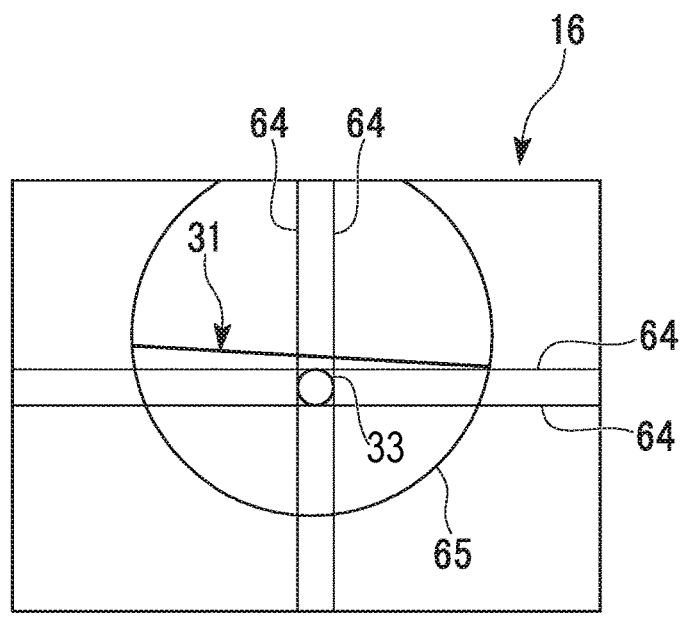
FIG. 9A is a view showing a synthetic image displayed on a monitor screen.

At this time, the synthetic image generated by the synthetic image generation device 61 is displayed on the monitor screen 16 installed on the control panel 138. Here, FIG. 9A is a view showing the synthetic image displayed on the monitor screen 16. The image obtained by the camera 41 of the base end portion camera unit 14 constituting the first positioning device 11, that is, the image of the target hole 33 formed in the upper panel 31, and a total of four target lines 64, that is, two lines for the longitudinal direction×two lines for the lateral direction that the storage device 60 has stored in advance, are displayed on the monitor screen 16. Meanwhile, the other image obtained by the camera 41, that is, the aperture outline 65 of the photographing hole 22c formed in the rear spar 22, is also marked in FIG. 9A.

As shown in FIG. 9A, the worker slowly descends the upper panel 31 vertically downward while the image of a substantially circular target hole 33 is remains inscribed within the four target lines 64. Meanwhile, the image of the target hole 33 slowly becomes large as the upper panel 31 approaches the rear spar 22. Accordingly, a mode of the monitor screen 16 can be switched in response to this, and the interval of the two longitudinal target lines 64 and the interval of the two lateral target lines 64 become wide every time the mode is switched.

Figure 9B:
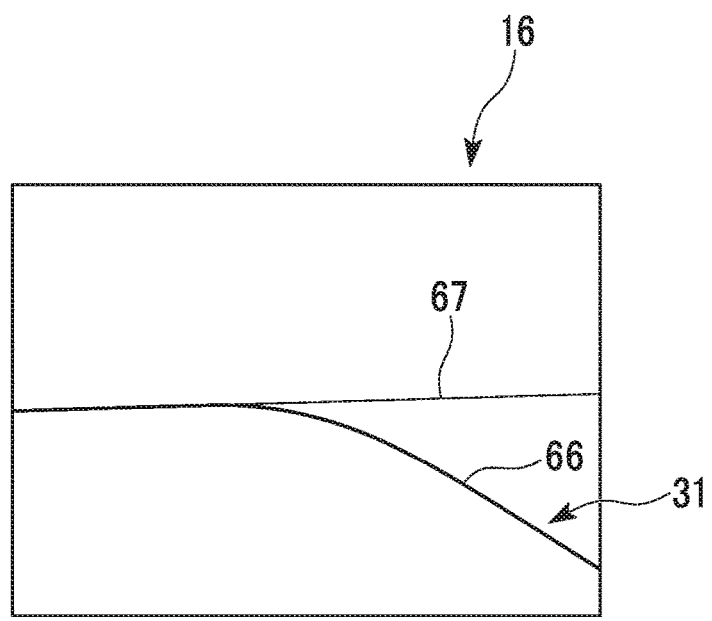
FIG. 9B is a view showing a synthetic image displayed on the monitor screen.

Further, the worker positions the front end portion of the upper panel 31 with respect to the front end portion of the rear spar 22 by rotating the upper panel 31 within a horizontal plane with the position at which the image of the target hole 33 and the image of the photographing hole 22c coincide. At this time, the worker switches the display of the monitor screen 16 to display the image obtained by the camera 57 of the front end portion camera unit 15 constituting the first positioning device 11. Here, FIG. 9B is a view showing the synthetic image displayed on the monitor screen 16. The image obtained by the camera 57 of the front end portion camera unit 15, that is, an edge 66 of the upper panel 31 and one lateral target line 67 stored in advance in the storage device 60, are displayed on the monitor screen 16.

Thus, it is possible to reliably obtain the image of the target hole 33 of the upper panel 31 until the upper panel 31 contacts the rear spar 22, because the camera 41 is held to face vertically upward through the photographing hole 22c, even if the upper panel 31 with the axis inclined with respect to the vertical direction is assembled in the vertical direction with respect to the rear spar 22 having the photographing hole 22c with the axis inclined likewise with respect to the vertical direction. Therefore, accurate positioning of the upper panel 31 and the rear spar 22 becomes possible.

In addition, the worker stops the rotation within the horizontal plane of the upper panel 31 when the image of the edge 66 of the upper panel 31 coincides with the target line 67, as shown in FIG. 9B. Accordingly, the front end portion of the upper panel 31 and the front end portion of the rear spar 22 are positioned with respect to each other. After that, when the upper panel 31 contacts the rear spar 22, the worker stops the descending of the upper panel 31. Thus, as the positions of the target hole 33 and the photographing hole 22c are aligned, the base end portion of the upper panel 31 and the base end portion of the rear spar 22 are positioned with respect to each other. After that, the worker fixes the front end portion of the upper panel 31 and the front end portion of the rear spar 22 using a fastening tool (not shown) such as a bolt.

Next, the worker ascends the lower panel 32 vertically upward by operating the control panel 138 to drive the lower elevating stand 134, with the lower panel 32 supported by the lower panel support unit 133, as shown in FIG. 4. Meanwhile, with the lower panel 32 supported from below by the lower panel support unit 133, the axis of the target hole 34 formed in the lower panel 32 is inclined with respect to the vertical direction.

At this time, the sequence of the display of the synthetic image generated by the synthetic image generation device 61 on the monitor screen 16, the vertically upward ascent of the lower panel 32 as the worker views the synthetic image, and the stopping of the ascent of the lower panel 32 when the target hole 34 of the lower panel 32 and the rear spar 22 coincide is the same as that of the upper panel 31.

After that, the sequence of the rotation of the lower panel 32 within the horizontal plane with the position which is fixed in the rear spar 22 as the fulcrum, the stopping of the rotation of the lower panel 32 when the edge 66 of the lower panel 32 displayed on the monitor screen 16 coincides with the target line 67, the fixing of the base end portion of the lower panel 32 and the base end portion of the rear spar 22 using a fastening tool, and the fixing of the front end portion of the lower panel 32 and the front end portion of the rear spar 22 using a fastening tool is also the same as that of the lower panel 32.

Further, in the present embodiment, the upper panel 31 is descended or the lower panel 32 is ascended in order to position the upper panel 31 and the lower panel 32 with respect to the rear spar 22, but on the other hand, the rear spar 22 may be ascended toward the upper panel 31 or descended toward the lower panel 32.

Further, in the present embodiment, the worker descends the upper panel 31 or ascends the lower panel 32 by operating the control panel 138 while viewing the monitor screen 16, but the present invention is not limited thereto, and the descent of the upper panel 31 or the ascent of the lower panel 32 may be automated under the control of a controller that is not shown. In other words, the positional relation between the target hole 34 and the target line 64 on the monitor screen 16 or the positional relation between the edge 66 and the target line 67 are detected, and the motion of the upper panel suction unit 131, the lower panel support unit 133 or the like may be controlled by the controller based on the results of detection.

All of the shapes, combinations, operation sequences, and the like of the components shown in the above mentioned embodiments are examples, and various modifications may be possible based on, for example, design needs within the range without departing from the gist of the present invention.

INDUSTRIAL APPLICABILITY

According to the present invention, it is possible to provide a method for manufacturing a structure that can position a pair of members with high accuracy by a simple operation when manufacturing a structure by assembling a pair of members.

DESCRIPTION OF REFERENCE NUMERALS

1: main wing
2: spar
3: panel
4: rib
10: main wing manufacturing apparatus
11: first positioning device
12: second positioning device
13: assembling device
14: base end portion camera unit
15: front end portion camera unit
16: monitor screen
17: clamp unit
18: positioning unit
19: camera holding unit
20: contacting piece
21: front spar
22: rear spar
23: first operation knob
24: protruding piece
25: bolt
26: second operation knob
27: nut
28: support bracket
29: reference block
31: upper panel
32: lower panel
33: target hole
34: target hole
40: camera holder
41: camera
42: camera fixing hole
43: fixing screw
44: positioning pin
45: camera reference position confirming device
46: clamp unit
47: positioning unit
48: camera holding unit
49: contacting piece
50: shaft
51: pressing member
52: first operation knob
53: reference block
54: positioning protrusion
56: camera holder
57: camera
58: base end portion camera unit
59: front end portion camera unit
60: storage device
61: synthetic image generation device
62: target line information
63: protruding piece
64: target line
65: aperture outline
66: edge
67: target line
131: upper panel suction unit
132: upper elevating stand
133: lower panel support unit
134: lower elevating stand
135: front spar holding unit
136: rear spar holding unit
137: conveying unit
138: control panel
210: shaft
220: pressing member
22*a*: parallel piece
22*b*: connecting piece
22*c*: photographing hole
29*a*: first reference face
29*b*: second reference face
29*c*: protruding portion
29*d*: camera inserting hole
3*a*: panel body
3*b*: stringer
45*a*: lower deck
45*b*: leg portion
45*c*: upper deck
45*d*: camera inserting hole
45*e*: fixing screw hole
45*f*: reference line

The invention claimed is:

1. A system comprising:
a wing body including a first member having a photographing hole at a base end portion and a second member having a hole at a base end portion, the photographing hole and the hole are configured to be aligned with each other during assembly of the wing body; and
a manufacturing apparatus, the manufacturing apparatus including:
a first imaging device mounted on a base end portion camera unit installed at the base end portion of the first member, being smaller than the photographing hole, installed within the photographing hole, and configured to obtain an image of the hole of the second member;
a second imaging device mounted on a front end portion camera unit installed at a front end portion of the first member and configured to obtain an image of the second member;
a synthetic image generation device which generates a first synthetic image by synthesizing preset marking information for aligning the second member with respect to the image of the hole of the second member; and
a display device which displays the first synthetic image thereon.

2. The system according to claim 1, wherein
the base end portion camera unit is installed on an inner surface of the base end portion of the first member in a wing chord direction, and
the front end portion camera unit is installed on an outer surface of the front end portion of the first member in the wing chord direction.

3. The system according to claim 1, further comprising:
a storage device which stores, in advance, marking information, as the preset marking information, for aligning the photographing hole of the first member and the hole of the second member,
wherein the marking information is input to the synthetic image generation device from the storage device, and includes a figure of at least one of lines and points.

4. The system according to claim 3, further comprising:
a camera reference position confirming device configured to perform positioning of the first imaging device to generate the first synthetic image from the marking information and the image of the hole of the second member.

5. The system according to claim 4, wherein
the synthetic image generation device generates a second synthetic image by synthesizing the marking information for aligning the second member with respect to the image of the second member, and
the camera reference position confirming device is further configured to perform positioning of the second imaging device to generate the second synthetic image from the marking information and the image of the second member.

* * * * *